United States Patent [19]

Nikolaus

[11] Patent Number: 5,311,548
[45] Date of Patent: May 10, 1994

[54] DIGITAL CONTROL ELECTRONIC HAVING A PULSE WIDTH MODULATED (PWM)-OUTPUT SIGNAL FOR THE CONTROL OF ELECTRIC CONTROL ELEMENTS OF A HYDRAULIC SYSTEM

[75] Inventor: Heinrich Nikolaus, Hamburg, Fed. Rep. of Germany

[73] Assignee: Mannesmann Rexroth GmbH, Lohr, Fed. Rep. of Germany

[21] Appl. No.: 854,823

[22] Filed: Mar. 20, 1992

[30] Foreign Application Priority Data

Mar. 21, 1991 [DE] Fed. Rep. of Germany ....... 4109233

[51] Int. Cl.$^5$ ............... H02M 3/10; G05B 11/28; H01F 7/18
[52] U.S. Cl. ................... 375/22; 340/825.63
[58] Field of Search ........... 328/111, 113; 307/234; 375/22; 370/9, 11; 340/825.63, 825.64, 825.83

[56] References Cited

U.S. PATENT DOCUMENTS

| 2,725,191 | 11/1955 | Ham | 332/111 |
| 3,568,147 | 3/1975 | Gilson | 328/111 |
| 4,497,068 | 1/1985 | Fisher | 375/22 |
| 4,543,575 | 9/1985 | Liermann | 340/825.63 |

FOREIGN PATENT DOCUMENTS

3707442 9/1988 Fed. Rep. of Germany .

OTHER PUBLICATIONS

Patents Abstract of Japan vol. 10 No. 300 (P-506) 2356 Oct. 1986 re JP-A-61 117 602.
"Constant Voltage source . . . ", Elektor Electronics, Feb. 1984, pp. 2-59—2-61.

Primary Examiner—Stephen Chin
Assistant Examiner—Paul Loomis
Attorney, Agent, or Firm—Cushman, Darby & Cushman

[57] ABSTRACT

A digital electronic control apparatus for controlling at least one electronic control element comprises. The apparatus comprises first and second pulse width modulated output signal generators, the frequency of the second signal being different from the first. The second pulse width modulated signal is provided as a function of a digital value determined by at least one of a characteristic and operating condition of the at least one electronic control element. An AND-gate receives the first and second pulse width modulated signals and is capable of producing an output signal for controlling the at least one electronic control element a first and second pulse width modulated signal having a first frequency.

10 Claims, 2 Drawing Sheets

5,311,548

DIGITAL CONTROL ELECTRONIC HAVING A PULSE WIDTH MODULATED (PWM)-OUTPUT SIGNAL FOR THE CONTROL OF ELECTRIC CONTROL ELEMENTS OF A HYDRAULIC SYSTEM

BACKGROUND OF THE INVENTION

1. Technical Field

This invention relates to a digital electronic control apparatus providing a pulse width modulated output signal for the control of at least one electronic control element of a hydraulic system. The present invention relates specifically to a digital electronic control supplying a pulse width modulated output signal for the control of an electric solenoid which is used for actuating a hydraulic valve which, in turn, is adapted to adjust hydraulic characteristics, like for instance the pressure and/or the flow of a hydraulic medium like hydraulic oil.

2. Description the Prior Art

Digital electronic control apparatus of the above mentioned type are already known and in use. For instance, such apparatus includes a current controller which supplies an output signal for maintaining a control element in a position determined by a desired value signal.

Typically, the digital output signal (control or controlling value) of the current (I) controller is transformed into a pulse width modulated signal (PWM-signal), the duty cycle of which is proportional to the output signal value of the current controller. The electronic control can also be designed as an exclusively current control chain.

The PWM-signal is used for switching an electronic switch that supplies, for instance, the coil of a solenoid with voltage so that the solenoid is switched on and off with constant frequency in accordance with the duty cycle. As a result thereof an energizing current and an induced current, respectively, occur alternately, and a respective proportional voltage is derived from a metering resistance and is supplied as the actual value signal (middle value of current=current middle value) to the current controller.

DE 37 07 442 A1 discloses a prior art control electronic apparatus.

The known PWM-control electronic apparatus are adjusted to the impedance of the control element so as to be controlled such that a 100% use is made of the digital resolution of the control value. In case, the electronic control is used to control a control element having a different, for instance a lower impedance, then the digital resolution of the control value can not be obtained up to 100%. For instance, if the electronic control is designed for a control element having an impedance of 24 ohms then a control element having a impedance of 12 ohms can use the control value only in the amount of 50%, inasmuch as in this case twice the current is reached.

Thus, a control electronic apparatus is desirable which provides, for different impedance values, a high resolution of the electronic control values.

SUMMARY OF THE INVENTION

The present invention provides a digital electronic control apparatus supplying a (first) pulse width modulated output signal for controlling one or more electrical control elements. A preferred example of a control element is a solenoid (electric magnet) which is used for the actuation of a hydraulic valve. The digital electronic control apparatus comprises an AND-gate by means of which a second pulse width modulated signal having a different pulse width modulated frequency is superimposed onto said first mentioned pulse width modulated signal.

By superimposing in an AND-gate the PWM-signal (control signal) with a second PWM-signal having a different frequency and being independent of the control signal, the PWM controlling signal is reduced and thus it is possible to also control electronic control elements having smaller impedance values by a control signal of the controller having the same size or value (100% resolution). Additional features of the invention are disclosed hereinafter.

DETAILED DESCRIPTION OF THE PREFERRED EMBODIMENTS

Figure 1:
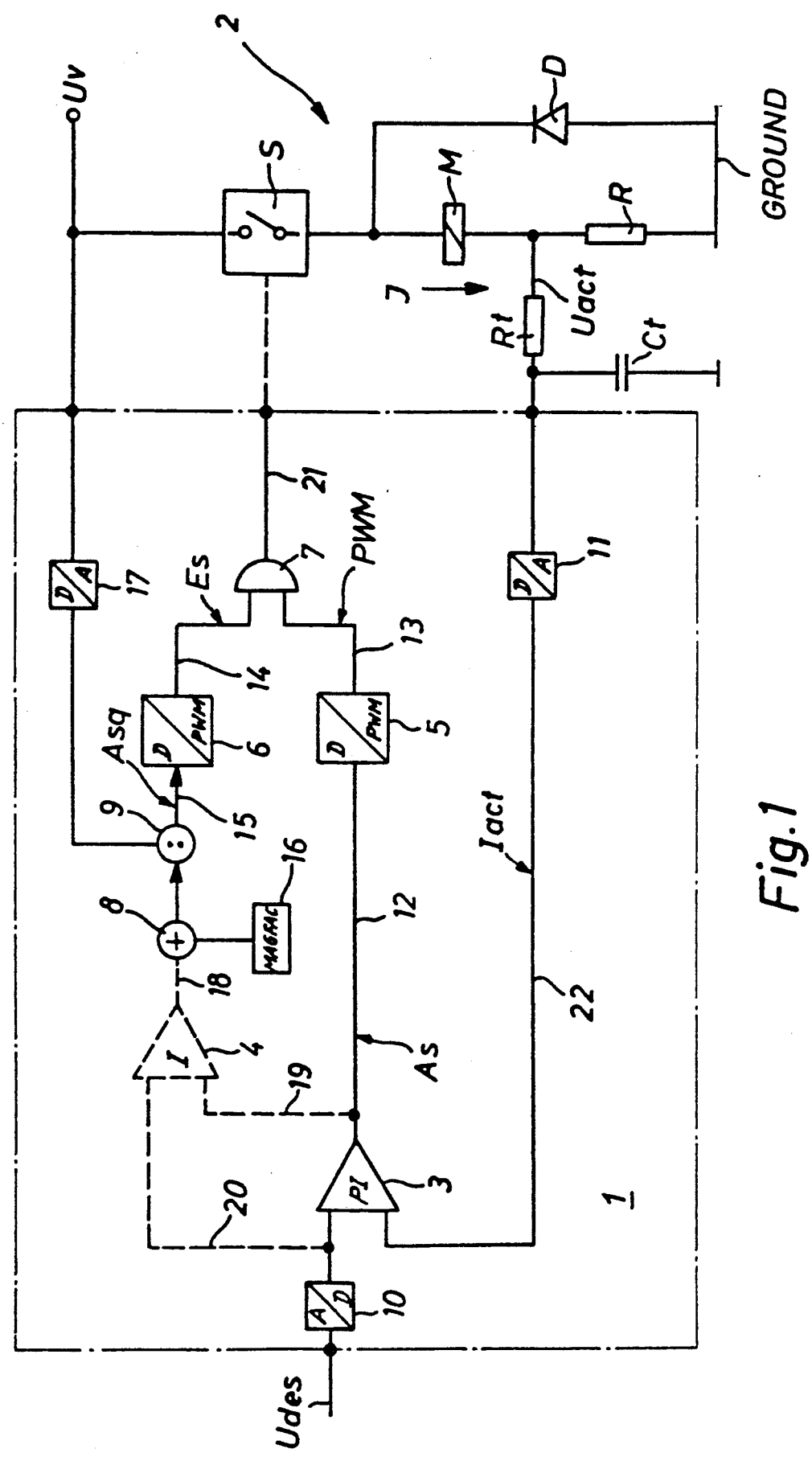
FIG. 1 is a diagram of a preferred embodiment of the circuit arrangement of a digital electronic control, according to the present invention.

FIG. 1 is the circuit arrangement of the digital electronic control comprising a micro controller 1 followed by an end stage 2. The digital electronic control is specifically intended to control an electric control element of a hydraulic system.

As shown in FIG. 1, a desired value signal (short: desired signal) Udes is supplied to the micro controller 1 in the form of an analog signal. By means of an integrated analog/digital converter 10 said desired signal Udes is transformed into a digital signal and is fed into a PI-controller (i. e. a proportional integral current controller) 3.

The end stage 2 is connected to said micro controller 1 and comprises an electronic switch S, a proportional magnet (solenoid) M (forming the control element), a metering resistance R as well as a free running diode D. The actual value (preferably a voltage) Uact is taken from said metering resistance R and is supplied to said current controller 3 via an analog/digital converter 11 in the form of a digital actual value signal 22. Prior to supplying the voltage/actual value signal Uact to the analog/digital converter 11 it is subjected to a smoothing operation by means of a low pass filter which comprises a resistance $R_T$ and a capacitor $C_T$.

The digital output signal 12 of the current controller 3, which is present as a controlling value of (a control signal) is supplied to an AND-gate 7 after having been transformed into a PWM (pulse-width-modulated) signal 13 in a digital pulse width modulator 5. The second input signal 14 of the AND-gate 7 is the output signal of a digital pulse width modulator 6. The value of the digital input signal 15 of the pulse width modulator 6 is determined by the characteristics and/or the operating conditions of the controlled control element which is preferably in the form of a solenoid (electro magnet) M of a proportional value.

The characteristics or characteristic values of the control element are stored in the form of digital values in a memory 16, and are supplied to a dividing circuit 9 as a numerator (dividend). The operating conditions like the supply voltage Uv are supplied to the dividing circuit 9 as a denominator (divisor) via an analog/digital converter 17. The output signal 15 of the dividing circuit 9 is the resulting quotient and forms the input signal of the digital pulse width modulator 6. Further operating conditions like the temperature are taken into consideration by a controller 4 of a sub-control circuit and are supplied in the form of an output signal 18 of said controller 4 to the summing circuit 8, so as to be added to the characteristic values supplied by the memory 16. The one (first) input signal 19 of the controller 4 corresponds to the controlling value or controlling signal 12 and the other (second) input signal 20 corresponds to the desired value signal Udes which exists in digital form. The sub-controller 4 acts as an integrating controller having a reset time which is larger than the reset time of the current (I)-controller 3 such that the controlling value 12 of the current controller 3 is provided with a post correction by the controller 4.

Figure 2:
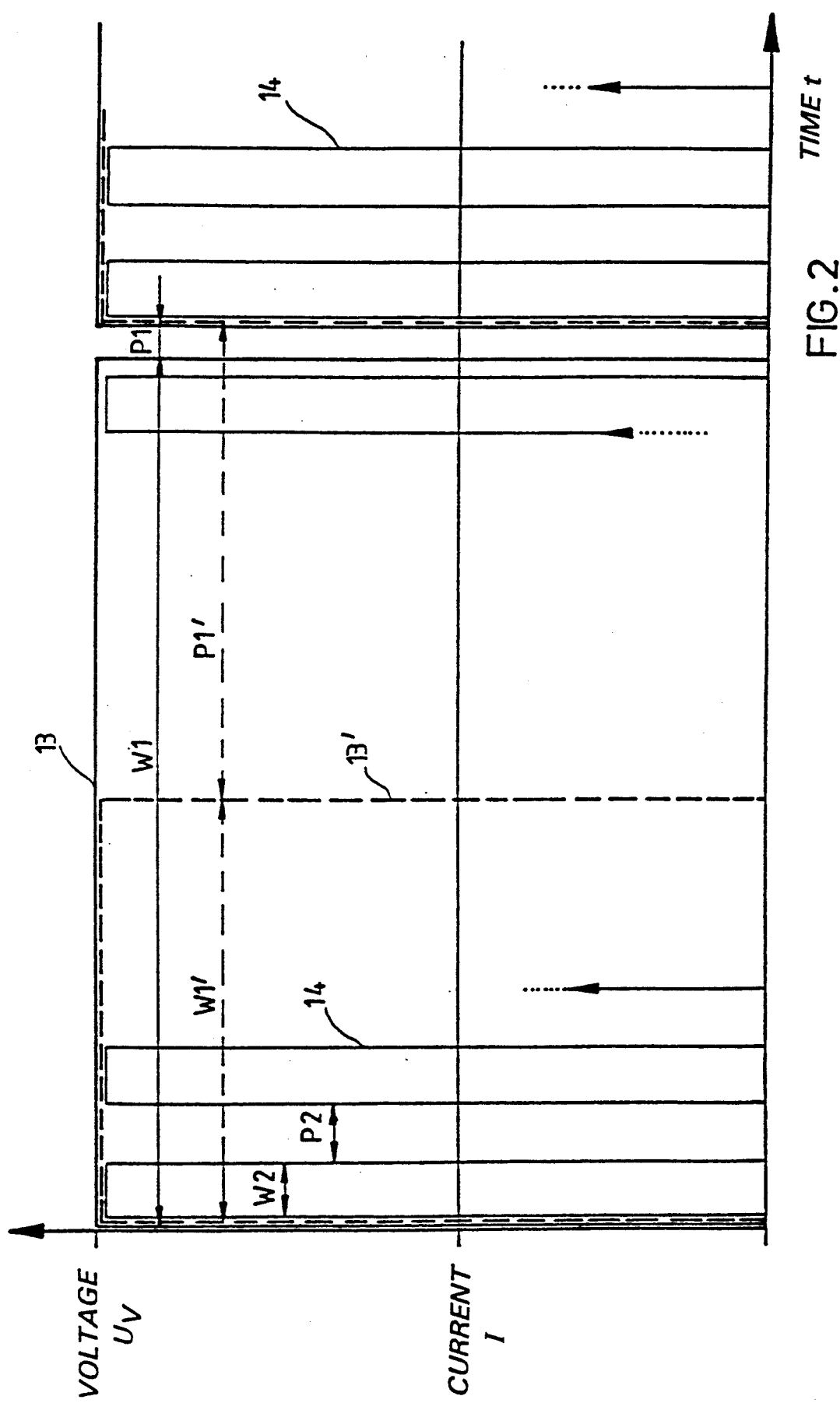
FIG. 2 is a diagram of the PWM-signals to be superimposed.

The electronic circuit S of the end stage 2 is opened and closed in accordance with the sampling duration of the PWM-output signal 21 of the AND-gate 7. During the duration of the pulse the switch S is closed and during the pause of the pulse the switch S is opened. In case the electronic switch S is closed, then an energizing current will flow from the supply voltage (source) Uv via the switch S to the coil of the solenoid M and via the metering resistance R towards ground. In case the electronic switch S is opened then an induced current continues to flow across the coil of the solenoid M, the metering resistance R, the ground, the free running diode D and back to the coil of the solenoid. The voltage Uact occurring at the metering resistance R is a value which is proportional to the actual current value I. The voltage corresponding to the actual current value is the voltage Uact, which is smoothed by a low pass ($R_T$, $C_T$) and forms the middle value for the current control. In FIG. 2 the PWM-signal of the digital pulse width modulator 5 is referred to by 13 and 13', respectively; the PWM-signal of the digital pulse width modulator 6 which is to be superimposed onto the PWM-signal of the digital pulse width modulator 5 is referred to by 14; the pulse width of the PWM-signal 13 and 13', respectively, is referred to by W1 and W1', respectively; the pulse pause or intermission is referred to by P1 and P1', respectively, and the pulse duration of the PWM-signals 14 is referred to by W2 and the pulse pause of said PWM-signal 14 is referred to by P2.

For an electronic control element, for instance a proportional solenoid having an impedance to which the control electronic is adjusted—i.e. the digital range of control values of the controller 3 is 100% used (for instance 8 bit)—the maximum control path (adjustment or actuating path)—for which the middle current value I is required—is reached corresponding to a 100% desired value input (Udes) for a pulse duration of W1 of approximately 100% and a pulse pause P1 of about 0% of the PWM-signal 13.

Now, if, for the same electronic control and for the same supply voltage Uv, a different electrical control element is used, such as one which has only half the impedance of the control element for which the control electronic was adjusted, then for such a different control element the maximum control path and the middle current I corresponding to 100% desired value input will already be reached for half the pulse duration W1' of the PWM-signal 13'. This means that also the range of the digital control values of the controller 3 is used only in an amount of 50% (7 bit).

Due to the superposition of the (first) PWM-signal 13 with the (second) higher frequency PWM-signal 14, which has an impulse duration W2 of about 50% and a pulse pause P2 of about 50%, again a pulse duration W1 of the PWM-signal 13 of about 100% is required for obtaining the maximum control path and the middle current value I required therefore, so that the range of digital control values of the controller 3 is again used in the amount of 100%.

Summarizing it can be said that a higher resolution of the control signal of a digital electronic control having a (first) pulse width modulated (PWM) output signal is obtained by providing that the first PWM-output signal is superimposed by means of a AND-gate with a second PWM-signal having a different PWM frequency.

I claim:

1. A digital electronic control apparatus for controlling at least one electronic control element comprising:
   means for generating a first pulse width modulated signal having a first frequency;
   means for generating a second pulse width modulated signal having a second frequency different from said first frequency, said second pulse width modulated signal being a function of a digital value determined by at least one of a characteristic and an operating condition of said at least one electronic control element; and
   a combining gate for receiving said first and second pulse width modulated signals and combining them to produce an output signal for controlling said at least one electronic control element.

2. The electronic control apparatus of claim 1, wherein said means for generating said first pulse width modulated signal comprises an electronic controller for generating a digital output signal and a pulse width modulator for transforming said digital output signal into said first pulse width modulated signal.

3. The electronic control apparatus of claim 1, wherein the control element comprises a proportional solenoid, and the characteristic determining the digital value of the second pulse width modulated signal is an impedance of the proportional solenoid.

4. The electronic control apparatus of claim 1, further comprising a dividing circuit for deriving the digital value of the second pulse width modulated signal by dividing at least two values, one of which corresponds to a supply voltage.

5. The electronic control apparatus of claim 3, wherein 100% of the first pulse width modulated signal corresponds to a nominal current of the proportional solenoid.

6. The control electronic apparatus of claim 1, further comprising a current controller for generating a controlling value, said first and second pulse width modulated signals used to control said at least one electronic control element being a function of said controlling value.

7. A digital electronic control apparatus as claimed in claim 1, further comprising a memory which stores at least one characteristic value which is a function of said characteristic of said at least one electronic control element.

8. A digital electronic control apparatus as claimed in claim 7, further comprising an analog to digital converter which provides at least one condition value which is a function of said operating condition of said at least one electronic control element.

9. A digital electronic control apparatus as claimed in claim 8, further comprising a dividing circuit which receives said characteristic value and said condition value to produce said digital value.

10. A digital electronic control apparatus as claimed in claim 1, wherein said combining gate is an AND-gate.

* * * * *